May 24, 1960
C. K. BUTLER ET AL
2,937,436
METHOD FOR FORMING GLASS REINFORCED METAL TUBING
Filed Nov. 19, 1956
3 Sheets-Sheet 3
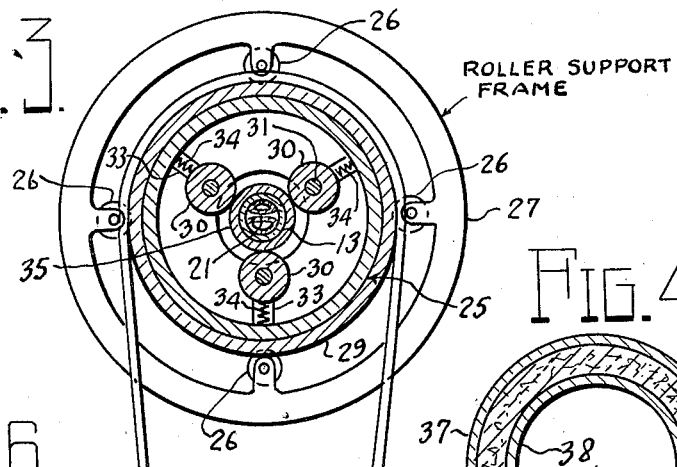
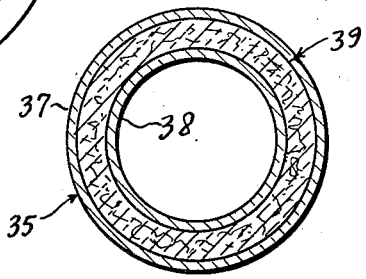
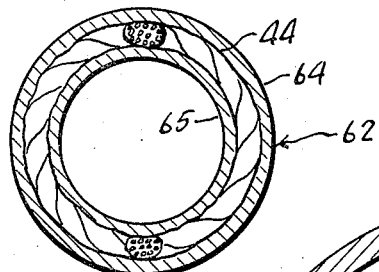
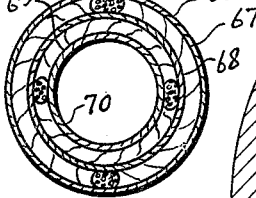
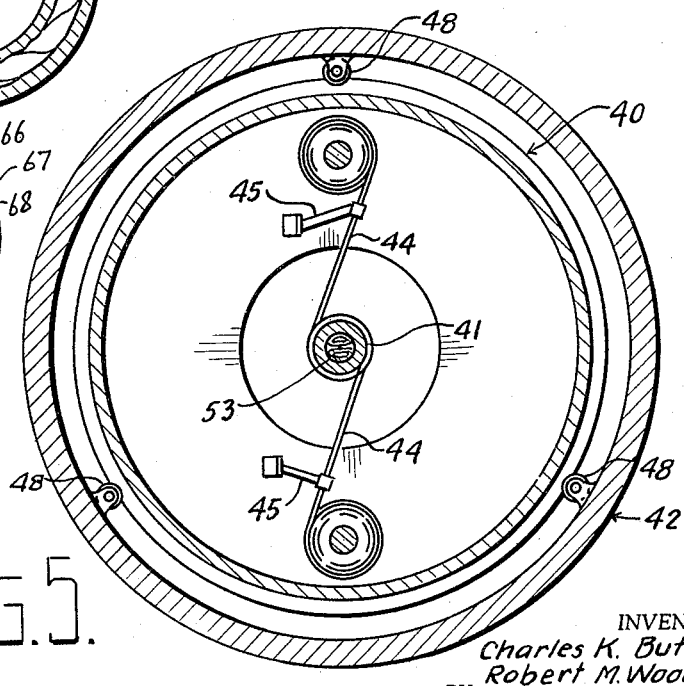
INVENTOR.
Charles K. Butler
Robert M. Woodward
BY
ATTORNEYS

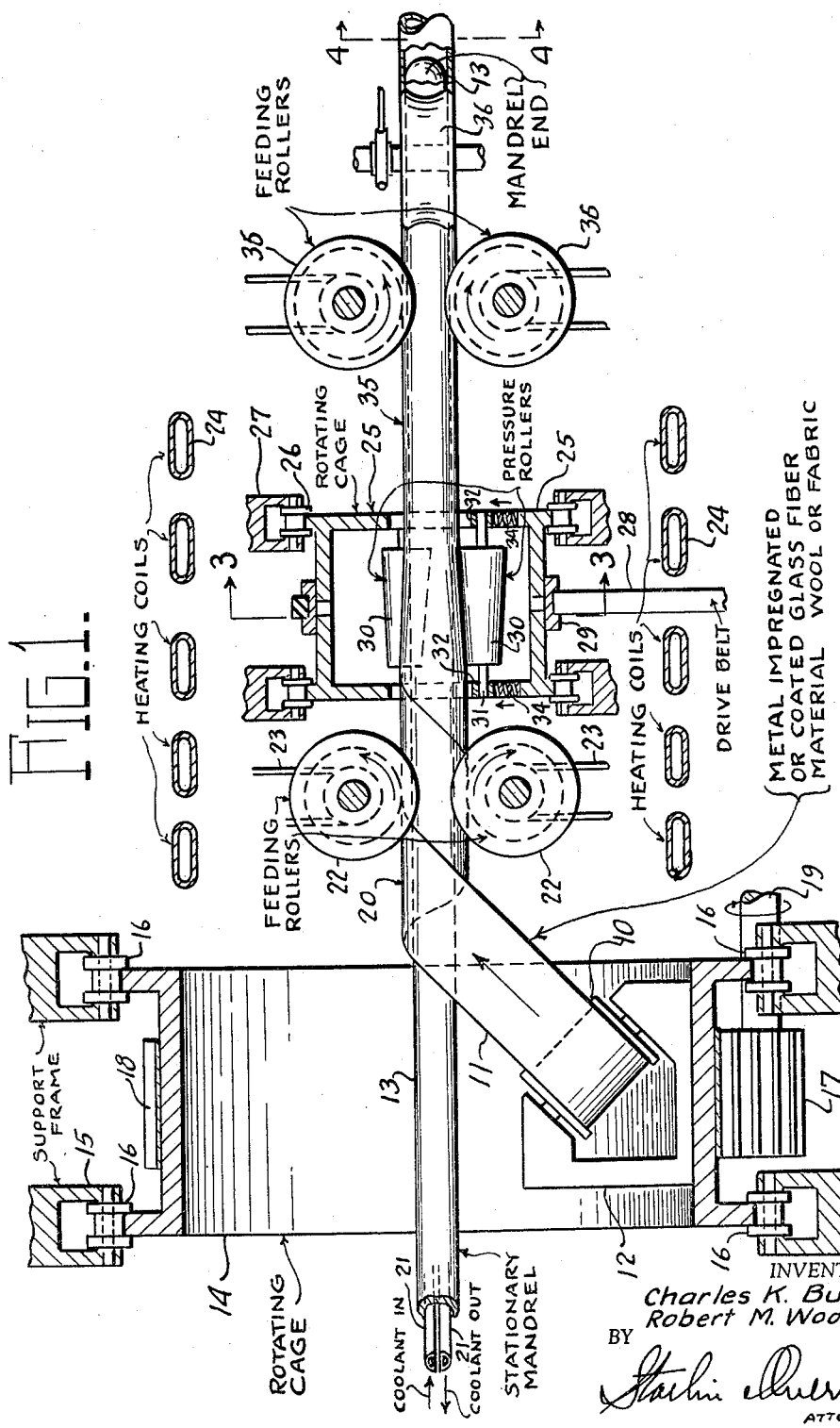

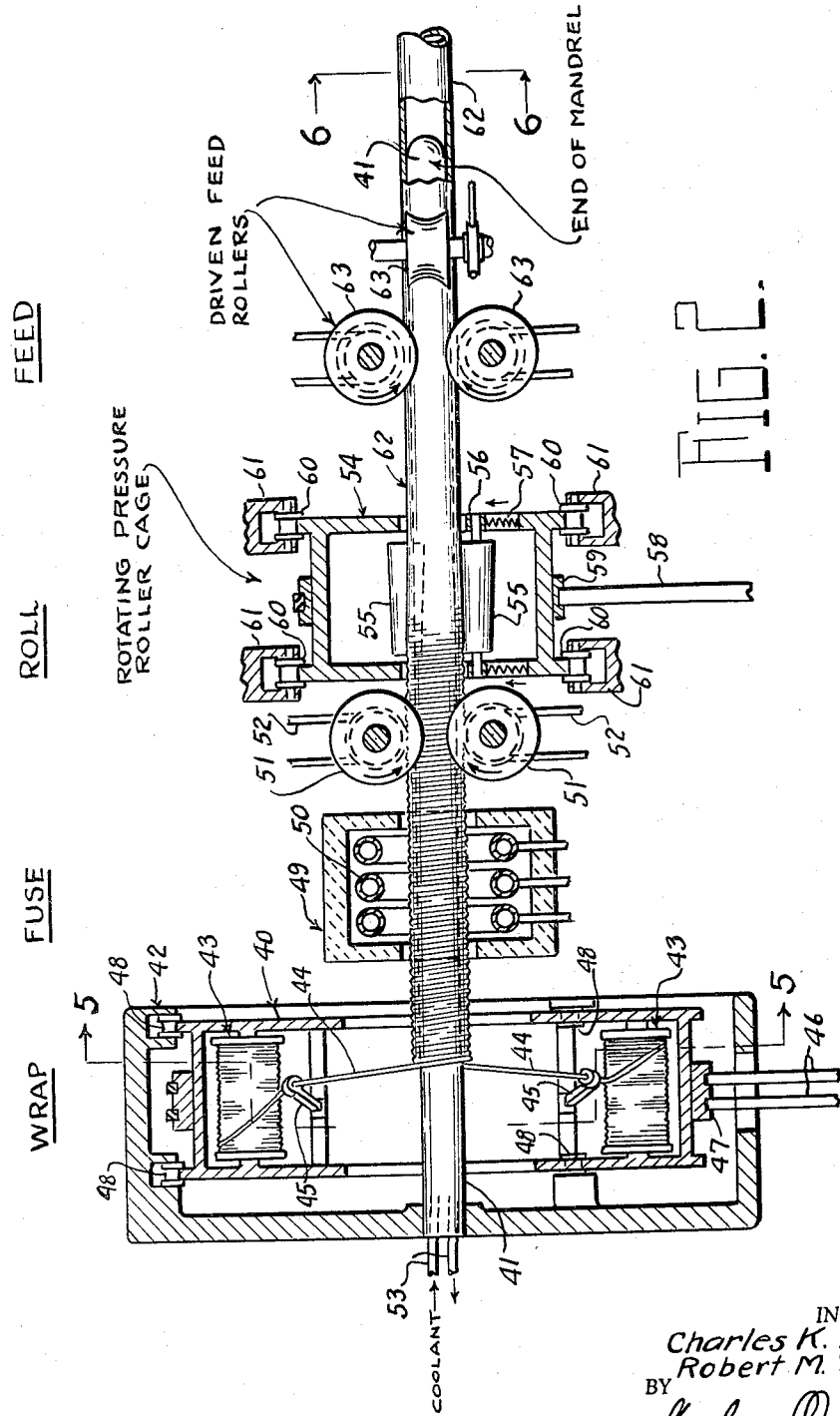

United States Patent Office 2,937,436
Patented May 24, 1960

2,937,436
METHOD FOR FORMING GLASS REINFORCED METAL TUBING

Charles K. Butler, Riverside, Calif., and Robert M. Woodward, Newark, Ohio, assignors to Owens-Corning Fiberglas Corporation, Toledo, Ohio, a corporation of Delaware Filed Nov. 19, 1956, Ser. No. 622,916
5 Claims. (Cl. 29—419)

This invention relates to a method for the continuous formation of metal tubing having walls which are reinforced by glass fibers. The invention is particularly directed toward a method for forming continuous metal and glass fiber masses into tubular form, for fusing the metal carried by the glass fibers, for rolling and shaping the metal and glass product to cohere its constituent portions and for solidifying the metal in tubular form.

It is the principal object of the invention to provide a method for the continuous formation of a reinforced metal tube wherein a continuous mass of reinforcing medium coated with or bearing a substantial quantity of metal is continuously formed into a tubular structure and the metal is fused together to form a continuous metallic tube reinforced by the fibrous medium.

It is a further object of this invention to provide a method for wrapping a continuous, metal-bearing, glass fiber element in a tubular shape, densifying and fusing the mass together so as to produce a continuous metal tube reinforced by the glass fibers.

Other and more specific objects and advantages of the invention will be better understood from the specification which follows and from the drawings in which:

Fig. 1 is a somewhat schematic view in vertical section of apparatus designed according to the invention for carrying out the method of the invention.

Fig. 2 is a view similar to Fig. 1 but illustrating a modification in which the reinforcing medium is different in nature from that employed in the practice of the invention according to Fig. 1.

Fig. 3 is a fragmentary, vertical sectional view taken along the line 3—3 of Fig. 1.

Fig. 4 is a vertical sectional view taken along the line 4—4 of Fig. 1 and shown on an enlarged scale.

Fig. 5 is a fragmentary vertical sectional view taken along the line 5—5 of Fig. 2.

Fig. 6 is a vertical sectional view taken along the line 6—6 of Fig. 2.

Fig. 7 is a view similar to Figs. 4 and 6 but illustrating a modified form of metal tube produced according to the invention.

In practicing the invention as illustrated in Fig. 1 a glass reinforced metal tube is fabricated from a continuous length of metal impregnated or coated glass fiber material such as a continuous length of wool or fabric. In Fig. 1 a reel 10 carrying a considerable length of a rolled up metal-bearing sheet 11 is mounted in an arbor 12. The sheet 11 may be a continuous length of glass fiber fabric where the individual threads making up the fabric are coated or partially impregnated with metal or it may be a continuous length of a metal-bearing, wool type product such as the blanket-like masses of heterogeneously arranged fibers which are employed for space insulation.

The reel 10 is rotatably journalled in the arbor 12 with its axis inclined at an angle to the axis of a stationary mandrel 13. The arbor 12 is carried on the interior of a rotating cage 14 that is coaxially mounted for rotation around the mandrel 13 by a support frame, fragmentarily indicated at 15, which mounts a plurality of rollers 16 in which the cage 14 rotates. The cage 14 is illustrated as being rotated by the engagement of a pinion 17 with a bull gear 18 on the exterior of the cage 14. Similarly, the cage 14 may be rotated by suitable belting engaged in sheaves extending around its exterior. The pinion 17 is illustrated as being mounted upon the end of a rotary shaft fragmentarily indicated at 19.

Rotation of the cage 14 around the mandrel 13 spirally wraps the material 11 onto the mandrel 13. If, at the same time the material 11 is being wrapped around the mandrel 13, it is progressively moved along the mandrel 13, a tubular structure with the edges of successive wraps in contact is built up on the mandrel 13. Such a tubular structure is generally indicated at 20 in Fig. 1.

The mandrel 13 is mounted upon a rigid support (not shown) and a pair of pipes 21 extend throughout its length for circulating coolant in the interior of the mandrel 13.

Grooved feeding rollers 22 are mounted upon opposite sides of the mandrel 13 just to the right of the rotating cage 14. The feeding rollers 22 may be driven, for example, by belts 23 shown in Fig. 1, at a speed proper to move the tubular body 20 along the mandrel 13 as it is formed thereon by the rotating, unreeling sheet 11.

The feeding rollers 22 are illustrated as being mounted upon parallel spaced axes and upon opposite sides of the mandrel 13. Additional feeding rollers may be utilized if desired, such rollers being spaced along the mandrel 13 where needed both to shape the tubular body being formed and to feed it along the mandrel 13.

After the sheet material 11 is wrapped on the mandrel 13 to form the body 20, the body 20 moves through a heating area generally delineated by heating coils 24 shown in Fig. 1. The coils 24 of Fig. 1 are intended to indicate either induction or di-electric heating means but their particular nature is not essential to the invention and the metal borne by the sheet material 11 may be softened so that the edges of the wraps of material adhere by any suitable heating mechanism.

After the metal with which the fibers are coated has been softened so that it will flow together the tubular body 20 is fed through a pressure roller cage 25 illustrated as being mounted in rollers 26 in a support frame 27 and as being driven by a belt 28 engaged in a pulley track 29 on the exterior of the cage 25. The cage 25 mounts a plurality of tapered pressure rollers 30 journalled by parallel, equally spaced shafts 31 in sliding journals 32. The journals 32 are mounted in radial grooves 33 (see Fig. 3) and urged inwardly with a predetermined pressure by suitable springs 34. The rotation of the cage 25 coupled with the tapered configuration of the pressure rollers 30 and the pressure of the springs 34 urging them inwardly, densifies the material in the tubular structure 20 and further aids in causing the softened metal to fuse together, flowing the metal partially into the interstices between the fibers of which the sheet 11 is made and between adjacent wraps thereof so that a continuous tubular structure generally indicated at 35 is formed.

At about this point in the operation, the heat applied to the apparatus by the heating coils 24 or by equivalent structures, is reduced so that the metal begins to solidify. It will be appreciated, of course, that the metal carried by the sheet material 11 should not be liquified but only softened sufficiently to fuse together, to permit densification of the composite article and yet to retain structural integrity thereby permitting the article to be slowly moved longitudinally along the mandrel 13.

Just to the right of the area delineated by the heating coils 24 or equivalent heating means, the tubular structure 35 is engaged by a plurality of feeding rollers 36 mounted upon axes normal to the axis of the mandrel 13 and staggered around the mandrel 13 so that the grooved surfaces of the feeding rollers 36 further tend to shape and densify the tubular structure 35. The action of the feeding rollers 36 pushes the tubular structure off the free end of the mandrel 13 leaving the tube 35 as shown in Fig. 4 with an exterior coat 37 of metal, an interior coat 38 of metal and an inner area generally indicated at 39 consisting of fibrous glass material at least partially impregnated with the metal forming the coats 37 and 38.

Proper timing including the speeds of wrap and feeding, proper continuation and temperature of the heat applied to the tubular arrangement 20 during its densification and fusing, produces a metal coated glass fiber tube, or glass reinforced metal tube, having the general characteristics indicated in Fig. 4. The relative quantities of metal and glass in the finished structure are determined, of course, by the percentages of those materials present in the initially fed sheet material 11. The thickness of the walls of the finished tube 35 is determined by the spacing between the peripheries of the feeding rollers 22 and 36 and the mandrel 13 and also by the force exerted by the springs 34 acting to thrust the rollers 30 inwardly to densify the mass during the softened condition of the metal.

Fig. 2 illustrates the formation of a continuous, glass reinforced, metal tube from a different original material. According to the invention as illustrated in Fig. 2, a rotary wrapping cage generally indicated at 40 is mounted in a support frame 42 for rotation coaxially around a mandrel 41. The wrapping cage 40 carries a plurality of rotary spools 43 in each of which is wound a substantial length of glass fiber strand, yarn or cord, in this case illustrated as a single ply, twisted yarn 44. Suitable guides 45 are carried by the cage 40 to guide the lengths of strand 44 off of the spools 43 so that they will be wrapped helically around the mandrel 41 as the cage 40 is rotated. Means for rotating the cage 40 in Fig. 2 consists of a pair of belts 46 engaged in a sheave 47 on the exterior of the cage 40. The cage is rotatably journalled by a plurality of rollers 48 carried by the frame 42.

In the operation as illustrated in Fig. 2 a fusing furnace 49 is located just to the right of the cage 40 and is shown as comprising a heating coil 50. Two or more feeding rollers 51 driven by belts 52 are located in the area adjacent the furnace 49 for feeding the helically wrapped mass of metal-bearing strand along the mandrel 41. As in the case of the earlier embodiment illustrated in Fig. 1, the mandrel 41 is hollow and a pair of coolant tubes 53 extend thereinto for controlling its temperature.

A rotating cage 54 similar to the cage 25 of Fig. 1 is coaxially mounted relative to the mandrel 41 and carries a plurality of tapered pressure rollers 55. The rollers 55 are urged inwardly on sliding journals 56 by suitable pressure springs 57. The cage 54 is driven by a belt 58 engaged in a sheave 59 and is rotatably supported by rollers 60 carried by a support frame 61. As in the embodiment of Fig. 1, the action of the inwardly pressed, tapered rollers 55 densifies the helically wrapped lengths of metal-bearing glass fiber strand and causes the softened metal to fuse together forming a continuous metal tube 62.

Suitable grooved periphery feeding rollers 63 are positioned around the mandrel 41 near its end for the purpose of further shaping and then feeding the metal tube 62 off the end of the mandrel 41.

As can be seen by reference to Fig. 6, the finished metal tube 62 has an outer metal skin 64, an inner metal skin 65 and partially impregnated helically wrapped lengths of strand 44 between skins 64 and 65. In Fig. 6 the tube 62 is shown as having but a single layer of helically wound reinforcing strand 44 but it will be appreciated that more than one wrapping cage 40 may be employed if desired to wrap a second or third helical layer of strand or yarn upon the exterior of the first helical layer. In this case the finished product in cross section would appear as illustrated in Fig. 7. The tube illustrated in Fig. 7 has an outer metal skin 66, an exterior helically wrapped layer of glass fiber strands 67, an inner metallic layer 68, and an inner layer of helically wrapped glass fiber strands 69, with an inner metallic skin 70.

Similarly, a metal tube having a greater quantity of glass present may be fabricated according to the process shown in Fig. 1 by wrapping a second layer of continuous sheet material around the exterior of the first layer. Such a tube is not illustrated in the drawings but would be similar to the tube illustrated in Fig. 4 except that it would have two layers 39 of fibrous glass material.

It will be appreciated that none of the tubes shown in Figs. 4, 6 or 7, or similar tubes actually exhibits the clean lines of demarcation between the metal skin and the fibrous glass reinforcement that is shown in the drawings. The metal penetrates more or less into the many interstices between the fibers of the wool-like mass 39 of Fig. 4 and the interstices between the individual filaments and wraps of strand or yarn of the layers 44 of Fig. 6 and 67 and 69 of Fig. 7.

We claim:

1. A method for forming fiber reinforced metal tubing, said method comprising wrapping at least one continuous length of metal-bearing fibrous material in a helical path with successive turns lying closely adjacent each other, softening the metal borne by such material, densifying substantially all of such material while the metal is soft and fusing the metal together by pressure against substantially all of the interior and exterior walls of the helically wrapped mass, and cooling the densified, fused, tubular mass.

2. A method according to claim 1 including wrapping the continuous material around the exterior of a cylindrical mandrel for establishing its inner diameter and moving the material and mandrel longitudinally relative to each other while carrying out the method.

3. A method according to claim 2 including rolling radially inwardly urged pressure rollers around the exterior of the helically wrapped material while the metal is softened for densifying the material and fusing the metal together around and between the reinforcing fibers.

4. A method for forming a continuous, fiber reinforced metal tubing, said method comprising helically wrapping a continuous length of metal-bearing fibrous wool around a tubular mandrel, progressively moving said material and said mandrel longitudinally relative to each other, heat softening said metal, densifying substantially all of said material and fusing said metal into a continuous mass and passing coolant through said mandrel for controlling the cooling of said metal into a tubular shape around said mandrel.

5. A method for forming a continuous, fiber reinforced metal tubing, said method comprising helically wrapping at least one continuous length of metal-bearing glass fiber yarn around a tubular mandrel, progressively moving said material and said mandrel longitudinally relative to each other, heat softening said metal, densifying substantially all of said material and fusing said metal into a continuous mass, and passing coolant through said mandrel for controlling the cooling of said metal into a tubular shape around said mandrel.

References Cited in the file of this patent

UNITED STATES PATENTS

| | | |
|---|---|---|
| 367,494 | Alden | Aug. 2, 1887 |
| 2,038,483 | Ferguson | Apr. 21, 1936 |
| 2,264,285 | Bennett | Dec. 2, 1941 |
| 2,332,726 | Joyce | Oct. 26, 1943 |
| 2,539,450 | Magill | Jan. 30, 1951 |
| 2,616,165 | Brennan | Nov. 4, 1952 |
| 2,724,176 | White | Nov. 22, 1955 |
| 2,729,180 | Freeze | Jan. 3, 1956 |